United States Patent
Bahadur et al.

(12)
(10) Patent No.: US 6,258,878 B1
(45) Date of Patent: Jul. 10, 2001

(54) ONE-PART MOISTURE-CURABLE HYDROCARBON POLYMER COMPOSITION

(75) Inventors: Maneesh Bahadur; Toshio Suzuki; Simon Toth, all of Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/277,871

(22) Filed: Mar. 29, 1999

(51) Int. Cl.[7] .............................. C08K 5/06; C08K 5/10; C08K 5/07; C08K 5/1515

(52) U.S. Cl. .................. 524/107; 524/284; 524/356; 524/366; 524/178; 556/482; 525/342; 528/38; 528/32; 528/39

(58) Field of Search ..................... 524/284, 356, 524/366, 107, 178; 556/482; 525/342; 528/38, 32, 39

(56) References Cited

U.S. PATENT DOCUMENTS

| 4,435,536 | 3/1984 | Kato ........................... 524/378 |
|---|---|---|
| 4,524,187 | 6/1985 | Greco et al. ................. 525/332.1 |
| 4,808,664 | 2/1989 | Saam ........................... 525/106 |
| 4,904,732 | 2/1990 | Iwahara ....................... 525/100 |
| 5,025,071 | * 6/1991 | Bullen . |
| 5,120,379 | * 6/1992 | Noda et al. . |
| 5,301,835 | * 4/1994 | Fulks et al. . |

FOREIGN PATENT DOCUMENTS

| 252372 | 1/1988 | (EP) . |
|---|---|---|
| 351106 | 1/1990 | (EP) . |
| 839864A2 | 6/1998 | (EP) . |
| 1-163255 | 6/1989 | (JP) . |
| 1-252670 | 10/1989 | (JP) . |
| 2-185565 | 7/1990 | (JP) . |
| 8-41359 | 2/1996 | (JP) . |

OTHER PUBLICATIONS

Polymer Handbook, 3rd Ed., 1989, pp. V/22–23, Edited by Brandrup et al., Wiley–Interscience.*
Encyclopedia of Polymer Science and Engineering, vol. 6, 1986, p. 483, Edited by Mark et al., Wiley–Interscience.*

* cited by examiner

*Primary Examiner*—Robert Dawson
*Assistant Examiner*—Kuo-Liang Peng
(74) *Attorney, Agent, or Firm*—Alex Weitz; Patricia M. Scaduto

(57) ABSTRACT

There is disclosed a stable, one-part moisture-curable composition containing:

(A) 100 parts by weight of a saturated hydrocarbon polymer having on average more than 2 hydrolyzable silyl groups in its molecule;

(B) 10 to 300 parts by weight of a silicon-free conduit compound having at least one $C_6$ to $C_{30}$ hydrocarbon group in its molecule, said compound being selected from the group consisting of
 (i) esters,
 (ii) ethers,
 (iii) epoxy-containing compounds,
 (iv) anhydrides and
 (v) ketones; and (C) a sufficient amount of a silanol condensation catalyst to cure said composition upon exposure to moisture.

16 Claims, No Drawings

ONE-PART MOISTURE-CURABLE HYDROCARBON POLYMER COMPOSITION

FIELD OF THE INVENTION

The present invention relates to a one-part, moisture-curable composition. More particularly, the invention relates to a composition wherein a hydrocarbon polymer containing hydrolyzable groups is mixed with an oxygen-containing compound having at least one long-chain hydrocarbyl group in its molecule.

BACKGROUND OF THE INVENTION

One-part, moisture-curable silicone compositions are well known in the art. These systems generally comprise a silicone polymer having hydrolyzable silyl functionality and a catalyst, inter alia. Upon exposure to a moist atmosphere, the silyl groups react with water to form silanol groups which, in turn, condense to form a cured siloxane network, the condensation being facilitated by the catalyst. Since the silicone polymers characteristically exhibit relatively high moisture permeability, these systems typically cure to a depth of more than 10 mm after a week-long exposure to a moist atmosphere. Such rapid deep-section cure is often desired in certain sealant or adhesive applications (e.g., construction, automotive, do-it-yourself market, insulating glass).

On the other hand, a similar cured product based on a hydrocarbon polymer composition offers the advantage of having a low permeability, making it an attractive candidate for gas barrier applications such as form-in-place gaskets, O-rings, rubber plugs/seals, medical and food container caps, and the like. Unfortunately, this advantage is largely overshadowed by the sluggish cure exhibited by these systems. Generally, these systems only develop a surface cure (e.g., less than I mm) within a week owing to the slow transport of water to the composition's interior relative to the above described silicones.

The undesirably slow cure rate of moisture-curable hydrocarbon-based compositions can, of course, be overcome by providing an internal moisture source in the form of a two-part composition. For example, Japanese Publication No. 2-185565 to Kanegafuchi Kagaku Kogyo Kabushiki Kaisha discloses a curable composition to provide cured product having good weather and heat resistance. This composition contains a saturated hydrocarbon polymer having at least one reactive silicon-containing group and a hydrate of a metal salt, the latter providing the water source needed to obtain a good deep-section cure. However, such a two-part system has severe disadvantages in commercial applications since it must be mixed just prior to use, requires additional packaging and often results in wasted product. Similarly, EP 0839864, also to Kanegafuchi, discloses a composition comprising such a silyl-functional polymer, a saturated hydrocarbon oligomer and an ester plasticizer. This invention does not contemplate a storage-stable, one-part moisture curable system and the examples only illustrate two-part compositions wherein water or a metal salt hydrate (i.e., the moisture source) and curing catalyst were compounded as separate components and mixed prior to cure.

In another approach, the cure rate of a moisture-curable hydrocarbon polymer composition can be improved by the inclusion of a component which facilitates the diffusion of water to the interior. Thus, Japanese Publication No. 1-252670 to Kanegafuchi Kagaku Kogyo Kabushiki Kaisha discloses a hydrolyzable silyl-functional polyisobutylene (PIB) of the type taught by Iwahara et al. in U.S. Pat. No. 4,904,732 in combination with an organosilicon polymer, the latter component apparently being responsible for augmenting transport of water and resulting in improved cure rates. However, such a silicone component is notorious for imparting poor paintability to the resulting cured surface (i.e., silicones generally decrease surface energy and make painting with conventional paints extremely difficult). Moreover, the silicones explicitly illustrated in the 1-252670 publication are silanol-functional polymers, such as hydroxyl-terminated polydimethylsiloxane. A composition which includes such a component could not be stored as one-part system since the silanol groups of the organosilicon polymer would react with the hydrolyzable groups on the PIB and therefore tend to gel the resulting network or at least react into the network.

Alternatively, U.S. Pat. No. 4,808,664 to Saam discloses a moisture-curable polyisobutylene having hydrolyzable silylsiloxy terminal groups. The inventor teaches that the compositions are preferably cured to form thin films, but also suggests that thicker films can be prepared by including up to about 20 weight percent of a "moisture-transporting agent" in the curable composition. The only such agent mentioned is ethyl orthosilicate and no example illustrating its utility is presented. Moreover, a compound like ethyl orthosilicate can also react with moisture and react into the network to increase the crosslink density thereof and such a large quantity would reduce the moisture transport rate of the surface skin which forms as the system cures. Further, such compounds are not readily miscible with hydrocarbon polymers and would tend to phase separate upon storage.

In addition to the above publications, various other ingredients have been generally disclosed as optional components in moisture-curable systems. For example, U.S. Pat. No. 4,435,536 to Kato et al. discloses one-pack, moisture-curable compositions based on hydrolyzable silyl group containing vinyl polymers wherein the inclusion of a solvent imparts storage stability and "workability" to the compositions. When cured, the compositions are said to have excellent surface hardness and weather resistance. The only specific limitation on the solvent is that it does not lead to precipitation when combined with the vinyl polymer and a curing catalyst and it can, therefore, be a hydrocarbon, alcohol, ketone, ether or ester, inter alia. Preferred solvents include alcohols and hydrolyzable esters, methanol, methyl orthoformate, ethyl orthoformate, methyltrimethoxilane and ethyl silicate being specifically illustrated. However, the systems illustrated appear to be cured at elevated temperatures as thin films and are not shown to provide deep-section cure. Additionally, the solvents illustrated either react into the network, as discussed above in connection with the Saam patent, or are too volatile to be retained in the composition as it cures. Furthermore, long-chain alkyl alcohols which are also suggested as solvents would tend to undergo an exchange reaction with the hydrolyzable groups on silicon to effectively cap the polymer with a long-chain alkoxy group which is not readily hydrolyzed, thereby interfering with the intended moisture cure.

Although the above publications generally disclose moisture-curable systems based on organic polymers having hydrolyzable silyl groups and they recite various required or optional ingredients, one skilled in the art is not apprised of the specific requirements needed to prepare a stable, one-part composition which exhibits relatively rapid deep-section cure upon exposure to moisture, as discovered by the applicants.

SUMMARY OF THE INVENTION

Surprisingly, it has now been found that certain silicon-free organic compounds can act as a so-called "conduit"

when added to a moisture-curable hydrocarbon polymer. By definition, such a conduit facilitates the transport of water to the interior of the composition where it can react with hydrolyzable groups on the polymer to provide deep-section cure in a one-part system. The conduit materials contemplated herein do not react into the polymer network and, therefore, continue to facilitate water transport as the crosslinking reaction progresses to provide a rapid, deep cure. Additionally, because they do not contain silicones, they do not reduce the paintability of the cured compositions and do not stain substrates. Finally, the instant conduit materials allow the formulation of a one-part moisture-curable system which is relatively storage stable with respect to rapid deep-section cure capability as well as with respect to phase separation of the conduit.

The invention therefore relates to a one-part moisture-curable composition consisting essentially of:

(A) 100 parts by weight of a saturated hydrocarbon polymer having on average at least 1.5 hydrolyzable silyl groups in its molecule;

(B) 10 to 300 parts by weight of a silicon-free conduit compound having at least one $C_6$ to $C_{30}$ hydrocarbon group in its molecule selected from the group consisting of esters, ethers, epoxy-containing compounds, anhydrides and ketones; and (C) a sufficient amount of a silanol condensation catalyst to cure said composition upon exposure to moisture.

DETAILED DESCRIPTION OF THE INVENTION

The saturated hydrocarbon polymer (A) must contain a sufficient amount of hydrolyzable silyl functionality to provide a moisture-curable composition. In this regard, the composition is considered curable when it forms a tack-free surface and a cohesive skin upon exposure to moisture. Preferably, the polymer has, on average, at least 1.5 silicon-bonded hydrolyzable groups per molecule, more preferably more than 2 such groups.

Polymer (A) can be any hydrocarbon polymer having no unsaturated carbon-carbon bonds other than aromatic rings. As used herein, the term "polymer" is generic to homopolymers, oligomers, interpolymers and copolymers, all of which are within the scope of the instant invention. Non-limiting examples include polymerized products of monomers such as:

(i) dienes, such as butadiene, isoprene and cyclopentadiene, wherein the polymer is subsequently hydrogenated;

(ii) olefins having 2 to 6 carbon atoms, such as ethylene, propylene, isobutylene, butene and hexene; and (iii) styrenic monomers, such as styrene, a-methyl styrene and p-methylstyrene.

Although there is no particular restriction on the molecular weight of the polymer, it is preferred that its number average molecular weight is in the range of 500 to 500,000, more preferably 5,000 to 100,000, particularly when the composition is to be utilized as a caulk or sealant.

The moisture-reactive silyl functionality of the hydrocarbon polymer can reside at the ends of the polymer or along the main chain and has the formula

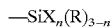

wherein R is independently selected from hydrocarbon groups having 1 to 30 carbon atoms (e.g., methyl, ethyl, propyl, butyl, hexyl, phenyl), n is an integer having a value of 1, 2 or 3 and X is a silicon-bonded hydrolyzable group selected from alkoxy, acyloxy, ketoxime, amino, amido, aminoxy or alkenyloxy groups, preferably containing no more than 6 carbon atoms. It is preferred that R is selected from alkyl having 1 to 6 carbon atoms or phenyl, X is methoxy or ethoxy and n is 2 or 3. The reactive silyl functionality can be connected to the polymer by a hydrocarbon group or through a short siloxane chain, as taught by Saam, cited supra.

Preferably, the saturated hydrocarbon polymer (A) is a linear or branched polymer or copolymer wherein at least 50 mole percent, preferably at least 80 mole percent, of the repeat units are isobutylene repeat units of the following structure

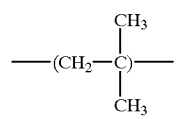

One or more hydrocarbon monomers, such as isomers of butylene, styrene, derivatives of styrene, isoprene and butadiene, may be copolymerized with the isobutylene, the preferred co-monomer being selected from 1-butene, a-methyl styrene, p-methylstyrene, isoprene, cyclopentadiene and butadiene. It is most preferred that the saturated hydrocarbon polymer is a PIB homopolymer containing groups of the formula —Si(X')$_n$(R)$_{3-n}$, where n=2 or 3, X'=OMe or OEt and R=Me, in which Me and Et hereinafter represent methyl and ethyl groups, respectively.

The above polymers are known in the art and various patent and technical publications describe the preparation of many representative examples thereof.

Conduit compound (B) is at least one oxygen-containing, non-reactive, organic compound which does not participate in the eventual network formed during cure of the instant compositions. In order to be within the scope of the present invention, it must have at least one $C_6$ to $C_{30}$ hydrocarbon group, such as alkyl, alkenyl, aryl, arylalkyl or alkylaryl, in its molecule. When the hydrocarbon group has fewer than 6 carbon atoms, the component is too volatile and tends to evaporate from the composition during cure, thus reducing water transport at the surface. Furthermore, compounds having fewer than 6 carbons in the hydrocarbon group tend to phase separate from the polymer upon prolonged standing. On the other hand, when the hydrocarbon group has more than 30 carbons, its conduit properties are essentially lost. As mentioned above, this component is a silicon-free compound and materials which contain reactive silicon groups, as well as the various organopolysiloxanes known in the art, are specifically excluded for use as component (B). Also explicitly excluded are alcohol and carboxylic acids. These compounds can interchange alkoxy or aryloxy groups with the hydrolyzable groups of component (A) to cap the polymer and thereby prevent optimal curing of the latter. Thus, within the above limitations, the types of oxygen-containing compounds contemplated for use as component (B) are:

(i) esters,
(ii) ethers,
(iii) epoxy-containing compounds,
(iv) anhydrides and
(v) ketones.

All of these compounds are well known in the art and further description thereof is considered unnecessary. Specific examples of esters include methyl nonate (i.e., nonanoate), ethyl nonate, ethyl octoate, ethyl oleate, methyl oleate, methyl stearate, methyl talloate, methyl cocoanate, methyl palmkernelate, isopropyl myristate, methyl palmitate, 2-ethylhexyl pelargonate, dioctyl adipate, dioctyl sebacate and ethyl nonate; aromatic esters, such as dibutyl phthalate, diheptyl phthalate, di(2-ethylhexyl)phthalate, butylbenzyl phthalate, pentaerythrityl tetracaprylate, carylic trigycerides, and pentaerithrityl tetraisostearate. Other contemplated esters are phosphate esters, such as trioctyl phosphate, tricresyl phosphate and tridecyl phosphate, peroxy esters of long-chain organic acids (e.g., decanoic acid) and peroxy esters such as diethylperoxyterephthalate.

Specific examples of ethers include dihexadecyl ether, ethylhexyl ether, methyloctyl ether, dinonyl ether, dioctadecyl ether and various polyethers.

Specific examples of epoxy-containing compounds include dodecylene epoxide, octadecylene epoxide, hexyl glycidyl ether, octyl clycidyl ether and decyl glycidyl ether.

Specific examples of anhydrides include dodecyl succinic anhydride, caproic anhydride, caprylic anhydride, lauric anhydride and stearic anhydride.

Specific examples of ketones include ethyloctyl ketone, heptadecanone, methylpentadecylketone and 3-octadecanone.

In the above described compounds, it is preferred that the hydrocarbon group is an alkyl group having 8 to 18 carbon atoms, more preferably 12 to 16 carbons. These ranges represent conduit compounds which exhibit low volatility and good miscibility while, at the same time, are relatively easy to handle (i.e., they are non-waxy) and impart a large conduit effect. Highly preferred specific conduit materials include esters of the formula

R'COOR"

wherein R' is an alkyl group having 8 to 16 carbon atoms and R" is an alkyl group having 1 to 10 carbon atoms and glycidyl ethers of the formula

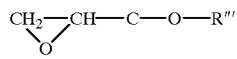

in which R''' is a $C_6$–$C_{16}$ alkyl group.

In general, the condensation catalyst (C) of the present invention is any compound which will promote the condensation reaction between SiOH groups so as to cure the instant composition by the formation of —Si—O—Si— bonds. Examples of suitable catalysts include carboxylates of such metals as tin, titanium bismuth, lead and zirconium. Examples of suitable tin catalysts include dibutyltin diacetate, dibutyltin dilaurate, tin tripropyl acetate, stannous octoate, stannous oxalate, stannous naphthanate, dibutylbis (2,4-pentadionate)tin. Specific titanates include tetra butyl titanate, titanium diisopropoxy-bis-ethylacetoacetate, tetraisopropoxy titanate and tetrabutoxy titanate. Additionally, amines such as triethyl amine, ethylenetriamine, butylamine, octylamine, dibutylamine, monoethanolamine, diethanolamine, triethanolamine, diethylenetriamine, triethylenetetramine, cyclohexylamine, benzylamine, diethylaminopropylamine, xylylenediamine, triethylenediamine, guanidine, diphenylguanidine and morpholine can be used as catalysts.

Preferably, the condensation catalyst is selected from the above described tin carboxylates, titanium carboxylates or mixtures thereof. It has also been found that addition of a minor amount of an organic amine, such as lauryl amine at 0.5 to 2 parts by weight for each 100 parts by weight of the polymer is useful when employing the tin compounds since it acts as a stabilizer. Most preferred catalysts are tin (IV) carboxylates since these have been observed to provide the most storage stable one-part compositions.

In addition to the above ingredients, the one-part, moisture-curable compositions of the present invention may contain optional components such as fillers, pigments, water scavengers, plasticizers, stabilizers, cure agents, adhesion promoters, antioxidants, ultraviolet adsorbents, lubricants, pigments, foaming agents, tackifiers, and the like. These additional components are, of course, only employed if they do not detract from curability or stability of the instant compositions.

In order to prepare the one-part, moisture-curable compositions of the invention, 100 parts by weight of the saturated hydrocarbon polymer is mixed with 10 to 300 parts by weight, preferably 25 to 200 and most preferably 50 to 150 parts by weight, of one or more of the above described conduit compounds and a sufficient amount of the silanol condensation catalyst to cure said composition upon exposure to moisture, the latter catalyst content preferably being 0.1 to 10, more preferably 0.5 to 6.0, parts by weight. If fewer than 10 parts of the conduit compound are used for each 100 parts of the polymer, the desired deep-section cure is not attained. Contrarily, addition of more than 300 parts of the conduit compound offers no further advantage and resulting compositions have poor thixotropy, tending to sag when formulated as sealants.

Mixing order is not critical but must be carried out under water-free conditions so as to preserve the hydrolyzable groups on the polymer. Typically, mixing is carried out under a dry gas atmosphere (e.g., dry nitrogen) in any apparatus capable of dispersing the components to form a uniform blend. Suitable mixers include twin-screw extruders, double planetary mixers, and the like (e.g., Hauschild Speed Mix™ from Flack Tek Inc., Landrum, S.C. and Whip Mix™ Vacuum Mixer from Whip Mix Corp., Louisville, Kent.). When the optional components described above are incorporated, they are preferably added after mixing the polymer with the conduit compound but before catalyst addition.

If the components of the instant compositions are well dried prior to mixing and the mixing is done in a moisture-free environment, there is no need for a water scavenger. However, generally from 0.5 to 5.0 parts by weight of the water scavenger are added for each 100 parts by weight of the polymer. The water scavenger is preferably added at the above stated low levels in order to remove any adventitious water present in the other components such that the composition does not prematurely cure upon storage. Preferred water scavengers are hydrolyzable silanes such as methyltrimethoxysilane, hexamethyldisilazane, an oxime silane, an aminosilane, an amidosilane, vinyltrimethoxysilane, tetraethoxysilane and ethyltrimethoxysilane. It should, however, be pointed out that materials such as methyltrimethoxysilane should not be used at levels greater than about S parts by weight per 100 parts of polymer since these compounds can react into the polymer network as it cures, thereby altering physical properties such as tensile strength and elongation. Further, any excess scavenger remaining after reacting with adventitious water would react with moisture during cure and thereby inhibit continued permeation thereof (i.e., lower depth of cure for a given time).

It is also preferred that from 10 to 500 parts by weight of a filler is added for each 100 parts of polymer. Suitable fillers include glass fiber, carbon fiber, mica, diatomaceous earth, fumed silica, precipitated silica, finely divided anhydrous silica, carbon black, calcium carbonate, clay, talc, titanium dioxide, magnesium carbonate, quartz, and the like. In many cases, surface treatment of these fillers with known treating agents such as silazanes, chlorosilanes and fatty acids is preferred for easier compounding and better physical properties. Fillers may be employed alone or in combination of two or more, the preferred filler being a silazane-treated fumed silica having a surface area of 50 to 500 m$^2$/g and used at level of 1 to 50 parts per 100 parts by weight of polymer. Typically, filler and water scavenger are included in sealant formulations of the invention.

Although it is possible to include up to about 200 parts by weight of a non-reactive hydrocarbon oil plasticizer based on 100 parts by weight of polymer (A) (e.g., the saturated hydrocarbon oligomer disclosed in EP 0839864, cited supra, or the paraffin oil used in the examples, infra), this embodiment is less preferred since such a component has been found to reduce deep-section cure after a given exposure to moisture. Thus, preferred compositions according to the instant invention are essentially free of such a non-reactive hydrocarbon oil component.

The compositions of the invention find utility as moisture-curable sealants, potting compounds, encapsulants, caulks, adhesives and coatings. The PIB-based systems are particularly suited for the manufacture of gaskets (e.g., form-in-place gaskets) for gas-tight applications since the permeability of the cured compositions is close to that of the unmodified polymer. Specific preferred applications include use of the compositions in the fabrication of elastomeric seals for insulating glass structures and formulation of sealants for construction and vibration damping applications (e.g., in automobiles, appliances, disc drives, audio speakers). In many of these applications, it is contemplated that a composition of the invention is formulated with one or more of the above mentioned additional components to form a one-part sealant composition which, in turn, is packaged in a hermetically-sealed container, such as a cartridge or sausage skin, the latter being described in U.S. Pat. No. 5,301, 835 to Fulks et al. Such a container can be stored for extended periods and, when needed, the sealant contained therein can be dispensed (extruded) using a caulking gun, or the like.

EXAMPLES

The following examples are presented to further illustrate the composition of this invention, but are not to be construed as limiting the invention, which is delineated in the appended claims. All parts and percentages in the examples are on a weight basis and all measurements were obtained at 25° C. unless indicated to the contrary.

The following materials, listed alphabetically for ease of reference, were employed in the examples.

Cat. 1=stannous octoate condensation catalyst (95%) marketed by Gelest (Tullytown, Pa.).

Cat. 2=dibutylbis (2,4-pentadionate)tin condensation catalyst marketed by Gelest.

Cat. 3=Tyzor™ DC condensation catalyst, a titanium diisopropoxy-bis-ethylacetoacetate marketed by Du Pont Chemicals, Wilmington, Del.

Cat. 4=tetra-t-butyl titanate condensation catalyst, marketed by Du Pont Chemicals.

Cat. 5=tin (II) ethylhexanoate catalyst obtained from Aldrich Chemical Co., Milwaukee, Wis.

Cat. 6=stannous octoate (see Cat. 1) mixed with laurylamine (from Aldrich Chemical Co.) in a 3:1 ratio.

CE1295=CE-1295 methyl ester, a mixture of methyl esters of $C_8$ to $C_{16}$ aliphatic carboxylic acids, about 97% being the $C_{12}$ methyl ester, obtained from Procter & Gamble Chemicals (P & G), New Milford, Conn. (conduit).

DIDP=Jayflex™, a diisodecyl phthalate marketed by Exxon Chemicals, Bay Town, Tex. (conduit).

DY027=Araldite™ DY027, an alkyl glycidyl ether wherein the alkyl groups are predominantly $C_8$ and $C_{10}$, marketed by Ciba Specialty Polymers, Brewster, N.Y. (conduit).

EN=ethyl nonanoate obtained from Aldrich Chemical Co. (conduit).

OPG=Crodamol™ OPG; octyl pelargonate (2-ethylhexyl nonanoate) marketed by Croda, Inc., Parsippany, N.J. (conduit).

HDK 2000=WACKER HDK® H 2000, a hydrophobic, fumed silica filler having a surface area of about 140 m$^2$/g and marketed by Wacker-Chemie GmbH, Adrian, Mich.

KP32=Daphne Oil KP32-U, a paraffin oil having a viscosity of 35 cS (m$^2$/s) at 40° C. and marketed by Apollo America Corp., Southfield, Mich.

KP100=Daphne Oil KP100-U, a paraffin oil having a viscosity of 103 cS (m$^2$/s) at 40° C. and marketed by Apollo America Corp.

MN=methyl nonanoate obtained from Aldrich Chemical Co. (conduit).

MTM=methyltrimethoxysilane from Dow Corning Corp., Midland, Mich. (water scavenger).

PDMS=DMS-S15, a silanol-terminated polydimethylsiloxane having a viscosity of 45–85 cS (m$^2$/s), marketed by Gelest.

PIB 1=EPION® 200A, an allyl-terminated telechelic polyisobutylene polymer having a number average molecular weight of about 5,500 and marketed by Kanegafuchi Kagaku Kogyo Kabushiki Kaisha, Japan.

PIB2=Kaneka S-PIB, a blend of 70% of a methyldimethoxysily-terminated telechelic polyisobutylene polymer having a number average molecular weight of about 10,000 and 30% of above described KP-32 plasticizer.

Marketed by Kanegafuchi Kagaku Kogyo Kabushiki Kaisha.

Experimental Materials and Procedures:

One-part moisture-curable compositions were prepared under substantially anhydrous conditions using a nitrogen purge. All solid fillers were dried under reduced pressure at elevated temperatures for at least 24 hours prior to use.

All conduit materials were dried by storing over neutral 3-Angstom molecular sieves for 24 hours prior to use. Water content determinations by the Karl Fischer method (E203) of the American Society of Testing Materials (ASTM) showed that moisture content was ≦0.01% in each case.

Tack-free time (TFT) was measured according to the following procedure. Each formulation was coated onto a clean, non-porous surface (polyethylene or polypropylene substrate) at a thickness of about 2 mm and allowed to cure at 21±2° C./50±4% relative humidity. At various times, a clean polyethylene strip was placed on a fresh surface of the formulation and light fingertip pressure was applied thereto. This polyethylene strip was allowed to remain in place for 4±2 seconds and was then pulled straight up from one end (i.e., at a 90 degree angle from the curing composition). When the polyethylene strip pulled away cleanly from the sample (i.e., without removing any of the curing composition), the elapsed time from when the composition was first exposed to the atmosphere was recorded as the TFT.

Cure-in-depth (CID) or cure depth or skin thickness, was determined as follows. As each of the above described formulations cured, a crosslinked skin formed on its surface. This cured skin was removed from the bulk composition using a thin blade and forceps and placed on the surface of a polyethylene film. Care was taken to minimize the deformation of the cured skin. The skin/polyethylene composite was placed on the stage of a micrometer with the uncured sealant surface facing up toward the micrometer probe, the latter being allowed to sink through the uncured sealant surface to rest on the surface of the cured sealant (69 g mass applied to a probe having a diameter of 6.4 mm). CID was calculated as the measured thickness minus the thickness of the polyethylene film. These CID values were recorded at 24, 48 and 168 hours points after initial exposure to the atmosphere and were designated as CID24, CID48 and CID168, respectively.

Preparative Example 1

Production of the hydrocarbon Polymer:

A trimethoxysilyl-functional telechelic polymer was prepared from PIBI by the procedure shown in Example 2 of the patent to Saam et al., cited supra. PIBI (1500 g) was placed in the bowl of a one gallon high speed dispenser (Applied Silicone Corp., Ventura, Calif.). A siloxane of the formula $(MeO)_3Si—CH_2—CH_2—Me_2SiOSi(Me_2)H$ (168 g) wherein Me hereinafter denotes methyl group, and a platinum (vinylsiloxane) catalyst (reference: Hitchcock et. al., Angew. Chem. Int. Ed. Engl., 30, 1991) were added, the latter at a molar ratio of $1 \times 10^{-4}$ equivalents per allyl group of PIB1. The high shear and planetary mixing blades were started and the components were mixed at room temperature for 30 minutes. The temperature was then ramped up to 70° C. and maintained thereat for two hours. Reaction product was then transferred to an air-tight container equipped with a nitrogen purge.

Nuclear Magnetic Resonance (NMR) spectroscopy and Gel Permeation Chromatography (GPC) analysis of the reaction product gave following results:

GPC: $M_n$=5,740, $M_w/M_n$=1.16;

Silicon NMR: 2 peaks centered at −41 and −43 ppm (Si-OMe resonances) and 4 peaks at 8–10 ppm range (Si-Me resonance);

Carbon NMR: 50 ppm (OMe resonance); and

Proton NMR: 3.46 ppm (OMe resonance).

Example 1

One hundred parts of the polymer from Preparative Example 1, 0 to 100 parts of a conduit material and 6 parts of a tin catalyst were thoroughly mixed in a Hauschild™ mixer at room temperature, the proportions being shown in Table 1. These formulations were evaluated for TFF and CID and the results are also shown in Table 1.

TABLE 1

| Ex. | Polym. | KP 32 | CE1295 | OPG | DY027 | Cat. 1 | TFT (min.) | CID24 (mm) | CID48 (mm) |
|---|---|---|---|---|---|---|---|---|---|
| 1A | 100 | | | | | 6 | 40 | 0.10 | 0.15 |
| 1B | 100 | 100 | | | | 6 | 25 | 0.25 | 0.42 |
| 1C | 100 | 100 | 100 | | | 6 | 15 | 0.85 | 1.50 |
| 1D | 100 | | 100 | | | 6 | 25 | 1.64 | 3.14 |
| 1E | 100 | 100 | | 100 | | 6 | 10 | 1.05 | 2.00 |
| 1F | 100 | | | 100 | | 6 | 20 | 1.25 | 2.30 |
| 1G | 100 | 100 | | | 100 | 6 | 15 | 1.10 | 2.00 |
| 1H | 100 | | | | 100 | 6 | 10 | 1.75 | 3.25 |

From Table 1, it can be seen that compositions which did not include a conduit material consistently exhibited lower CID values than those containing the conduit. This was observed whether or not the formulation contained KP32 hydrocarbon plasticizer. The largest increases were obtained when no hydrocarbon plasticizer was included (Examples 1D, 1F and 1H).

(Comparative) Example 2

One hundred parts of polymer from Preparative Example 1 were mixed with the ingredients shown in Table 2 according to the procedure described in Example 1. The formulations were transferred to air tight bottles and stored in an oven maintained at 50° C. A portion of each formulation was periodically withdrawn and tested for TFT and CID at 0 (i.e., initial), 1, 7 and 30 days of thermal aging of the formulation. The evaluation results being shown in Tables 3A, 3B, 3C and 3D, respectively.

TABLE 2

| Ex. | Polymer | KP 32 | KP 100 | HDK2000 | MTM | Cat.1 | Cat.2 |
|---|---|---|---|---|---|---|---|
| 2A | 100 | 100 | | 20 | 2.5 | | 6 |
| 2B | 100 | 50 | | | 2.5 | 6 | |
| 2C | 100 | 50 | | 15 | 2.5 | 6 | |
| 2D | 100 | | 50 | | 2.5 | 6 | |
| 2E | 100 | | 50 | 15 | 2.5 | 6 | |
| 2F | 100 | 50 | | | 2.5 | | 6 |
| 2G | 100 | 50 | | 15 | 2.5 | | 6 |
| 2H | 100 | | 50 | | 2.5 | | 6 |
| 2I | 100 | | 50 | 15 | 2.5 | | 6 |

TABLE 3A

| | CID and TFT results with no thermal Aging | | | |
|---|---|---|---|---|
| Ex. | TFT (min.) | CID24 (mm) | CID48 (mm) | CID168 (mm) |
| 2A | 6 | 0.38 | 0.56 | 1.24 |
| 2B | 15 | 0.28 | 0.38 | 0.97 |
| 2C | 30 | 0.38 | 0.56 | 1.24 |
| 2D | 30 | 0.25 | 0.38 | 0.86 |
| 2E | 15 | 0.36 | 0.48 | 1.07 |

TABLE 3A-continued

CID and TFT results with no thermal Aging

| Ex. | TFT (min.) | CID24 (mm) | CID48 (mm) | CID168 (mm) |
|---|---|---|---|---|
| 2F | 15 | 0.25 | 0.41 | 0.74 |
| 2G | 15 | 0.33 | 0.43 | 0.94 |
| 2H | 10 | 0.23 | 0.28 | 0.58 |
| 2I | 15 | 0.30 | 0.38 | 0.84 |

TABLE 3B

CID and TFT results for 1 day thermal Aging

| Ex. | TFT (min.) | CID24 (mm) | CID48 (mm) | CID168 (mm) |
|---|---|---|---|---|
| 2A | 8 | 0.41 | — | 1.22 |
| 2B | 25 | 0.38 | 0.66 | 0.86 |
| 2C | 25 | 0.44 | 1.55 | 1.68 |
| 2D | 20 | 0.30 | 0.56 | 0.84 |
| 2E | 14 | 0.61 | 1.35 | 1.52 |
| 2F | 8 | 0.20 | 0.48 | 0.61 |
| 2G | 24 | 0.30 | 0.76 | 0.97 |
| 2H | 16 | 0.20 | 0.38 | 0.66 |
| 2I | 25 | 0.30 | 0.69 | 0.89 |

TABLE 3C

CID and TFT results for 7 days thermal Aging

| Ex. | TFT (min.) | CID24 (mm) | CID48 (mm) | CID168 (mm) |
|---|---|---|---|---|
| 2A | 7 | 0.30 | — | 1.85 |
| 2B | 80 | 0.31 | — | 0.84 |
| 2C | 59 | 0.41 | — | 1.07 |
| 2D | 55 | 0.36 | — | 0.91 |
| 2E | 52 | 0.51 | — | 1.27 |
| 2F | 13 | 0.25 | 0.30 | 0.64 |
| 2G | 9 | 0.30 | 0.38 | 0.84 |
| 2H | 14 | 0.23 | 0.46 | 0.53 |
| 2I | 15 | 0.28 | 0.30 | 0.79 |

TABLE 3D

CID and TFT results for 30 days thermal Aging

| Ex. | TFT (min.) | CID24 (mm) | CID48 (mm) | CID168 (mm) |
|---|---|---|---|---|
| 2A | 8 | — | — | — |
| 2B | 150 | 0.08 | 0.28 | 1.27 |
| 2C | 150 | 0.08 | 0.61 | 1.78 |
| 2D | 150 | 0.18 | 0.36 | 1.02 |
| 2E | 60 | 0.30 | 0.64 | 1.78 |
| 2F | 20 | 0.20 | 0.30 | 1.32 |
| 2G | 10 | 0.25 | 0.36 | 0.91 |
| 2H | 20 | 0.30 | 0.25 | 0.89 |
| 2I | 10 | 0.20 | 0.30 | 0.97 |

When fillers and moisture scavengers were used and the formulations underwent thermal aging, the average CID24 and CID168 values were in the range of 0.19–0.35 and 0.94–1.24 mm, respectively (i.e., similar to the low values obtained for Examples 1A and 1B. As a result of thermal aging, some increase in the TFT was observed with tin octoate catalyst while CID values were essentially unchanged.

Example 3

One hundred parts of polymer from Preparative Example 1 was mixed with the ingredients shown in Table 4 according to the procedure described in Example 1. The formulations were aged at 50° C. and tested for TFT and CID at 0 (i.e., initial), 1, 7 and 30 days, as described in Example 3, the evaluations being shown in Tables 5A through 5D.

TABLE 4

| Ex. | Polym. | MN | EN | OPG | DY027 | HDK 2000 | MTM | Cat.1 | Cat.2 |
|---|---|---|---|---|---|---|---|---|---|
| 3A | 100 | 100 | | | | 20 | 5 | 6 | |
| 3B | 100 | | 100 | | | 20 | 5 | 6 | |
| 3C | 100 | 100 | | | | 20 | 5 | | 6 |
| 3D | 100 | | 100 | | | 20 | 5 | | 6 |
| 3E | 100 | | | 100 | | 20 | 5 | | 6 |
| 3F | 100 | | | | 100 | 20 | 5 | | 6 |

TABLE 5A

CID and TFT results for 0 days thermal Aging

| Ex. | TFT (min.) | CID24 (mm) | CID48 (mm) | CID168 (mm) |
|---|---|---|---|---|
| 3A | 9 | 1.80 | 2.24 | 7.20 |
| 3B | 6 | 2.16 | 3.10 | 7.49 |
| 3C | 4 | 1.09 | 2.40 | 7.24 |
| 3D | 3 | 1.45 | 2.98 | 7.24 |
| 3E | 7 | 1.02 | 2.32 | 4.00 |
| 3F | 5 | 1.83 | 2.36 | 8.80 |

TABLE 5B

CID and TFT results for 1 day thermal Aging

| Ex. | TFT (min.) | CID24 (mm) | CID48 (mm) | CID168 (mm) |
|---|---|---|---|---|
| 3A | 100 | 2.24 | — | 5.80 |
| 3B | 100 | 1.98 | — | 5.50 |
| 3C | 5 | 1.02 | — | 4.18 |
| 3D | 8 | 1.07 | — | 5.84 |
| 3E | 3 | 0.97 | 1.52 | 4.0 |
| 3F | 8 | 1.55 | 2.59 | 8.79 |

TABLE 5C

CID and TFT results for 7 days thermal Aging

| Ex. | TFT (min.) | CID24 (mm) | CID48 (mm) | CID168 (mm) |
|---|---|---|---|---|
| 3A | 84 | 2.54 | 3.38 | 6.60 |
| 3B | 190 | 1.80 | 3.00 | 6.40 |
| 3C | 4 | 1.14 | 1.85 | 5.28 |
| 3D | 4 | 1.30 | 1.63 | 6.25 |
| 3E | 6 | 0.94 | 1.83 | 3.18 |
| 3F | 5 | 1.98 | 4.34 | 7.37 |

TABLE 5D

CID and TFT results for 30 days thermal Aging

| Ex. | TFT (min.) | CID24 (mm) | CID48 (mm) | CID168 (mm) |
|---|---|---|---|---|
| 3A | 300 | 2.34 | 3.58 | 8.43 |
| 3B | 325 | 1.68 | 2.97 | 7.85 |
| 3C | 5 | 0.97 | 1.37 | 7.09 |
| 3D | 7 | 1.07 | 1.65 | 7.57 |
| 3E | 10 | 1.07 | 2.41 | 5.89 |
| 3F | 10 | 1.80 | 3.05 | 8.46 |

From Tables 5A to 5D, it can be observed that the increased CID values are attributable to the use of conduit materials of the invention and that this effect is not materially altered by thermal aging or the inclusion of fillers or moisture scavengers.

Example 4

One hundred parts of polymer from Preparative Example I were mixed with the ingredients shown in Table 6 using 6 parts of the indicated catalyst, according to the procedure described in Example 1, CID values also being presented in this table.

TABLE 6

| Ex. | Polym. | KP 32 | CE1295 | OPG | Cat. | CID24 (mm) | CID48 (mm) |
|---|---|---|---|---|---|---|---|
| 4A | 100 | 100 | | | 6 | 0.32 | 0.45 |
| 4B | 100 | 100 | | | 2 | 0.26 | 050 |
| 4C | 100 | 100 | | | 3 | 0.35 | 0.56 |
| 4D | 100 | 100 | | | 4 | 0.38 | 0.45 |
| 4E | 100 | | 100 | | 6 | 2.32 | 4.00 |
| 4F | 100 | | 100 | | 2 | 1.86 | 2.90 |
| 4G | 100 | | 100 | | 3 | 1.72 | 3.05 |
| 4H | 100 | | 100 | | 4 | 1.85 | 2.95 |
| 4I | 100 | | | 100 | 6 | 2.25 | 3.55 |
| 4J | 100 | | | 100 | 2 | 1.98 | 3.05 |
| 4K | 100 | | | 100 | 3 | 2.00 | 3.00 |
| 4L | 100 | | | 100 | 4 | 1.92 | 3.25 |

From Table 6 it can be concluded that a titanium catalyst (i.e., Cat. 3 or Cat. 4) or a tin catalyst/co-catalyst (Cat 6) can be used without significant reduction of CID. In this table, Examples 4A through 4D are, of course, comparative examples which exhibit the usual low CID values of systems which do not contain a conduit of the invention.

Example 5

Eighty parts of PIB2 were mixed at room temperature in a vacuum mixer (Whip Mix™) with the ingredients shown in Table 7, wherein laurylamine was added as a co-catalyst.

Each formulation was applied to a polypropylene substrate and cured for 3 days, whereupon each coated substrate was painted with two types of water-based paint (one coat in each case), as indicated in Table 7. The paints were purchased at a local Ace™ Hardware store and had the brand names Ace Royal™ high gloss latex enamel (white) and Ace Royal Shield™ flat latex house paint (100% acrylic, white). After allowing the paints to dry for 5 days, adhesion of the paint was evaluated by ASTM method D3359 (standard Test Method B—Cross Cut Tape Test). Briefly, a 5 by 5 grid was cut into the paint film down to the sealant surface. Pressure-sensitive tape was applied over the lattice and then peeled away. Adhesion is reported in Table 7 as the percent of the paint grid area which detached from the sealant according to the following ratings: 5B: 0% (i.e., no paint removed); 4B: <5%; 3B: 5–15%; 2B: 15–35%; 1B: 35–65%,; 0B: >65% (i.e., more than 65% of the paint removed), wherein B indicates test method B was used.

TABLE 7

| Ex. | PIB2 | PDMS | DIDP | Cat.5 | Lauryl amine | Paint Adhesion: High gloss latex paint | Paint Adhesion: Acrylic latex paint |
|---|---|---|---|---|---|---|---|
| 5A | 80 | 20 | 20 | 3 | 0.75 | 0 B | 0 B |
| 5B | 80 | | 20 | 3 | 0.75 | 5 B | 2 B |
| 5C | 80 | 20 | | 3 | 0.75 | 0 B | 0 B |
| 5D | 80 | | | 3 | 0.75 | 5 B | 3 B |

From Table 7 it can be seen that control formulation SD and conduit formulation (5B) exhibited good to excellent adhesion to the water based paints. It is clear that addition of PDMS, either with (5A) or without (5C) the inclusion of the conduit DIDP, reduces adhesion to the minimum. It should also be noted that the silanol groups on the PDMS allow this component to participate in the polymer network.

That which is claimed is:

1. A one-part moisture-curable composition consisting essentially of:
   (A) 100 parts by weight of a saturated hydrocarbon polymer having on average at least 1.5 hydrolyzable silyl groups in its molecule and at least 50 mole percent of repeat units of said saturated hydrocarbon polymer are isobutylene units;
   (B) 10 to 300 parts by weight of a silicon-free conduit compound having at least one $C_6$ to $C_{30}$ hydrocarbon group in its molecule, said compound being selected from the group consisting of
      (i) esters,
      (ii) ethers,
      (iii) epoxy-containing compounds,
      (iv) anhydrides and
      (v) ketones; and
   (C) a sufficient amount of a silanol condensation catalyst to cure said composition upon exposure to moisture.

2. The composition according to claim 1, wherein said silyl groups have the formula

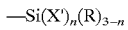

in which X' is selected from the group consisting of methoxy and ethoxy, R is methyl and n is an integer having a value of 2 or 3.

3. The composition according to claim 2, wherein said catalyst is a tin (IV) carboxylate.

4. The composition according to claim 1, wherein said conduit compound is selected from the group consisting of esters and epoxy-containing compounds.

5. The composition according to claim 4, wherein said conduit compound is an ester of the formula

wherein R' is an alkyl group having 8 to 16 carbon atoms and R" is an alkyl group having 1 to 10 carbon atoms.

6. The composition according to claim 4, wherein said conduit compound is a glycidyl ether of the formula

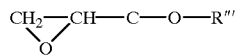

in which R'" is a $C_6$–$C_{16}$ alkyl group.

7. A one-part moisture-curable composition consisting essentially of:
   (A) 100 parts by weight of a saturated hydrocarbon polymer having on average at least 1.5 hydrolyzable silyl groups in its molecule and at least 50 mole percent of repeat units of said saturated hydrocarbon polymer are isobutylene units,
   (B) 10 to 300 parts by weight of a silicon-free conduit compound having at least one $C_6$ to $C_{30}$ hydrocarbon group in its molecule, said compound being selected from the group consisting of
      (i) esters,
      (ii) ethers,
      (iii) epoxy-containing compounds,
      (iv) anhydrides and
      (v) ketones;
   (C) 0.5 to 5 parts by weight of a water scavenger;
   (D) 50 to 500 parts by weight of a filler; and
   (E) a sufficient amount of a silanol condensation catalyst to cure said composition upon exposure to moisture.

8. The composition according to claim 7, wherein said conduit compound is selected from the group consisting of esters of the formula R'COOR" wherein R' is an alkyl group having 8 to 16 carbon atoms and R" is an alkyl group having 1 to 10 carbon atoms and glycidyl ethers of the formula

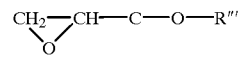

in which R'" is a $C_6$–$C_{16}$ alkyl group.

9. The composition according to claim 8, wherein said catalyst is a tin (IV) carboxylate.

10. A one-part moisture-curable composition consisting essentially of:
    (A) 100 parts by weight of a saturated hydrocarbon polymer having on average at least 1.5 hydrolyzable silyl groups in its molecule and at least 50 mole percent of repeat units of said saturated hydrocarbon polymer are isobutylene units;
    (B) 10 to 300 parts by weight of a silicon-free conduit compound having at least one $C_6$ to $C_{30}$ hydrocarbon group in its molecule, said compound being selected from the group consisting of
       (i) esters,
       (ii) ethers,
       (iii) epoxy-containing compounds,
       (iv) anhydrides and
       (v) ketones; and
    (C) a sufficient amount of a silanol condensation catalyst to cure said composition upon exposure to moisture, said composition being essentially free of unreactive hydrocarbon oil.

11. A container selected from a cartridge or a sausage skin which is filled with the composition according to claim 1.

12. A container selected from a cartridge or a sausage skin which is filled with the composition according to claim 2.

13. A container selected from a cartridge or a sausage skin which is filled with the composition according to claim 5.

14. A container selected from a cartridge or a sausage skin which is filled with the composition according to claim 6.

15. A container selected from a cartridge or a sausage skin which is filled with the composition according to claim 7.

16. A container selected from a cartridge or a sausage skin which is filled with the composition according to claim 10.

* * * * *